US012713230B2

(12) United States Patent
Pilock et al.

(10) Patent No.: US 12,713,230 B2
(45) **Date of Patent: *Aug. 18, 2026**

(54) CONTEXTUALLY AWARE, SMART IP ADDRESS

(71) Applicant: SMARTSKY NETWORKS LLC, Morrisville, NC (US)

(72) Inventors: Richard Pilock, Melbourne, FL (US); Blane Rockafellow, Raleigh, NC (US); Bryan S. Trainum, Williamsburg, VA (US); Brian Rudloff, Satellite Beach, FL (US); Michael Spencer Toedtli, Chapel Hill, NC (US); Thomas Dale Gahagen, Holly Springs, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 299 days.

This patent is subject to a terminal disclaimer.

(21) Appl. No.: 18/396,951

(22) Filed: Dec. 27, 2023

(65) Prior Publication Data

US 2024/0129721 A1 Apr. 18, 2024

Related U.S. Application Data

(63) Continuation of application No. 17/836,533, filed on Jun. 9, 2022, now Pat. No. 11,882,627, which is a (Continued)

(51) Int. Cl.

*H04W 8/26* (2009.01)
*H04B 7/185* (2006.01)

(Continued)

(52) U.S. Cl.

CPC .......... *H04W 8/26* (2013.01); *H04B 7/18506* (2013.01); *H04W 4/02* (2013.01);

(Continued)

(58) Field of Classification Search

CPC ....... H04W 8/26; H04W 4/42; H04W 36/328; H04W 4/02; H04W 84/005; H04B 7/18506

See application file for complete search history.

(56) References Cited

U.S. PATENT DOCUMENTS 6,609,004 B1 8/2003 Morse et al.
9,026,145 B1 5/2015 Duleba et al.

(Continued)

FOREIGN PATENT DOCUMENTS

EP 3283950 A2 2/2018
WO 2016175934 A1 11/2016

OTHER PUBLICATIONS

Communication pursuant to Article 94(3) EPC from European Application No. 19733264.6 dated Jun. 17, 2022, all pages cited in its entirety.

(Continued)

*Primary Examiner* — Curtis B Odom
(74) *Attorney, Agent, or Firm* — Burr & Forman

(57) ABSTRACT

A context awareness engine may include processing circuitry configured to receive a context update request from a content provider for an originator of a content request from a source internet protocol (IP) address associated with a dynamic context, determine updated context information for the originator based on the source IP address, and provide the updated context information to the content provider to enable the content provider to provide a response to the content request including requested content or additional content that is based on the updated context information.

20 Claims, 7 Drawing Sheets

Related U.S. Application Data continuation of application No. 16/972,374, filed as application No. PCT/US2019/035338 on Jun. 4, 2019, now Pat. No. 11,388,587.

(60) Provisional application No. 62/680,152, filed on Jun. 4, 2018.

(51) Int. Cl.
*H04W 4/02* (2018.01)
*H04W 4/42* (2018.01)
*H04W 36/32* (2009.01)
*H04W 84/00* (2009.01)

(52) U.S. Cl.
CPC ........... *H04W 4/42* (2018.02); *H04W 36/328* (2023.05); *H04W 84/005* (2013.01)

(56) References Cited

U.S. PATENT DOCUMENTS

| | | | | |
|---|---|---|---|---|
| 9,325,793 | B1 | 4/2016 | Stone et al. | |
| 11,388,587 | B2 * | 7/2022 | Pilock ................. | H04W 36/328 |
| 11,882,627 | B2 * | 1/2024 | Pilock ..................... | H04W 4/02 |
| 2006/0072594 | A1 | 4/2006 | Swamy | |
| 2006/0229058 | A1 | 10/2006 | Rosenberg | |
| 2008/0182573 | A1 | 7/2008 | Lauer et al. | |
| 2013/0059604 | A1 | 3/2013 | Zhu | |
| 2014/0156592 | A1 | 6/2014 | Bank et al. | |
| 2015/0106489 | A1 | 4/2015 | Duggirala | |
| 2016/0359706 | A1 | 12/2016 | Maddux et al. | |
| 2018/0027382 | A1 | 1/2018 | Taboso et al. | |
| 2018/0063075 | A1 | 3/2018 | Eckert et al. | |
| 2019/0191334 | A1 | 6/2019 | Montsma et al. | |

OTHER PUBLICATIONS

International Search Report and Written Opinion from related international application No. PCT/US2019/035338 mailed on Sep. 17, 2019, all pages cited in its entirety.

Notice of Reasons for Refusal in Corresponding Japanese Application No. JP 2022-567565 mailed May 2, 2023, all pages cited in its entirety.

First Office Action and Search Report in related Chinese Application No. 201980036436.7 mailed Feb. 8, 2024, all pages cited in its entirety.

* cited by examiner

CONTEXTUALLY AWARE, SMART IP ADDRESS

CROSS REFERENCE TO RELATED APPLICATIONS

This application is a continuation of U.S. application Ser. No. 17/836,533 filed on Jun. 9, 2022, which is a continuation of U.S. application Ser. No. 16/972,374 filed on Dec. 4, 2020 (now patented as U.S. Pat. No. 11,388,587 which issued on Jul. 12, 2022), which is a U.S. National Stage Entry of PCT/US2019/035338 filed Jun. 4, 2019, which claims priority to U.S. application No. 62/680,152 filed Jun. 4, 2018, the entire contents of which are hereby incorporated by reference in its entirety.

TECHNICAL FIELD

Example embodiments generally relate to wireless communications and, more particularly, relate to the use of actual position information, or other relevant context information, in relation to serving content to users of a wireless communication network instead of simply assuming the connection point of the users as their respective locations.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility. However, in spite of the familiarity that people have with remaining continuously connected to networks, some odd phenomena will be noticed by those who are connected on moving platforms, and particularly fast moving platforms.

For example, in terrestrial 3GPP standard networks, at the time a terminal attaches to a network, the terminal will select a serving cell based on the best available base station for its location. A specific serving gateway (SGW) is assigned, generally based on network topology. The SGW connects to a packet data network gateway (PGW) and the terminal becomes "homed" and "anchored" to the assigned PGW. All user data originating from the terminal or destined for the terminal are transmitted through the assigned PGW for as long as the terminal remains attached to the network. The Internet Protocol (IP) address of the terminal is associated with that PGW until the terminal detaches from the network.

As the terminal travels across the network, it may handover between different cells generally based on signal strength. The cell site handover may also trigger a handover to a different SGW when the terminal moves out of current SGW service area. However, the PGW to which the terminal is "homed" and "anchored" does not change. As a result, end-user data from the terminal to the Internet always departs the network through the "home" PGW and data destined for the end user always knows how to "find" the terminal through the terminal's association with the PGW. This works fine for the typical terrestrial network user, who generally stays in a relatively small geographic area. However, when the terminal travels across great geographic distances, the data between the terminal and the assigned PGW will be transmitted back and forth over a long distance, which introduces round-trip latency with potential negative impact on user-experience. Meanwhile, if the terminal should attempt to change its "homed" PGW and get a new IP address during the process, all established connections based on source and destination IP addresses between the terminal and its service providers will be disconnected. Additionally, various services provided via the network that are related to the location of the user (e.g., searches, browser-based targeted ads, mobile applications, etc.) become inaccurate or simply unusable.

The problem described above is exacerbated for any user that is traveling over large geographic distances, such as users on aircraft. Companies engaged in providing web services have generally considered the market for such users to be such a small percentage of the overall market for web services that efforts to address the problem have been minimal. However, if a solution could be provided, web services companies may have a powerful incentive to simply use the existing solution rather than spend their own resources to try to develop a solution. Accordingly, it may be desirable to provide a contextually aware, smart IP address that can address the problems described above.

BRIEF SUMMARY OF SOME EXAMPLES

In one example embodiment, a system is provided. The system may include a plurality of communication assets, a network configured to provide a connection point for each of the communication assets to communicate with one or more content servers to provide requests to the content servers and receive responses from the content servers, and a context awareness engine operably coupled to the network. The context awareness engine may be configured to provide a context update to a particular content server responsive to a context update request from the particular content server, the context update request being generated responsive to receipt of a source IP address indicating that a corresponding asset has a dynamic context, the dynamic context indicating that a location of the corresponding asset is not a location associated with the connection point to the network.

In another example embodiment, a context awareness engine is provided. The context awareness engine may include processing circuitry configured to receive a context update request from a content provider for an originator of a content request from a source internet protocol (IP) address associated with a dynamic context, determine updated context information for the originator based on the source IP address, and provide the updated context information to the content provider to enable the content provider to provide a response to the content request including requested content or additional content that is based on the updated context information.

In another example embodiment, a content server is provided. The content server may be configured to provide responses to requests received via a network that is configured to provide a connection point for a plurality of communication assets that provide the requests. The content server may include processing circuitry configured to receive a request from an asset having a source internet protocol (IP) address, determine that the source IP address is associated with an asset having a dynamic context, where the dynamic context indicates that a location of the asset is not a location associated with the connection point of the asset to the network, provide a query to receive a context update for the asset from a context awareness engine, and, responsive to receipt of the context update, generate a response to the request based on the context update.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
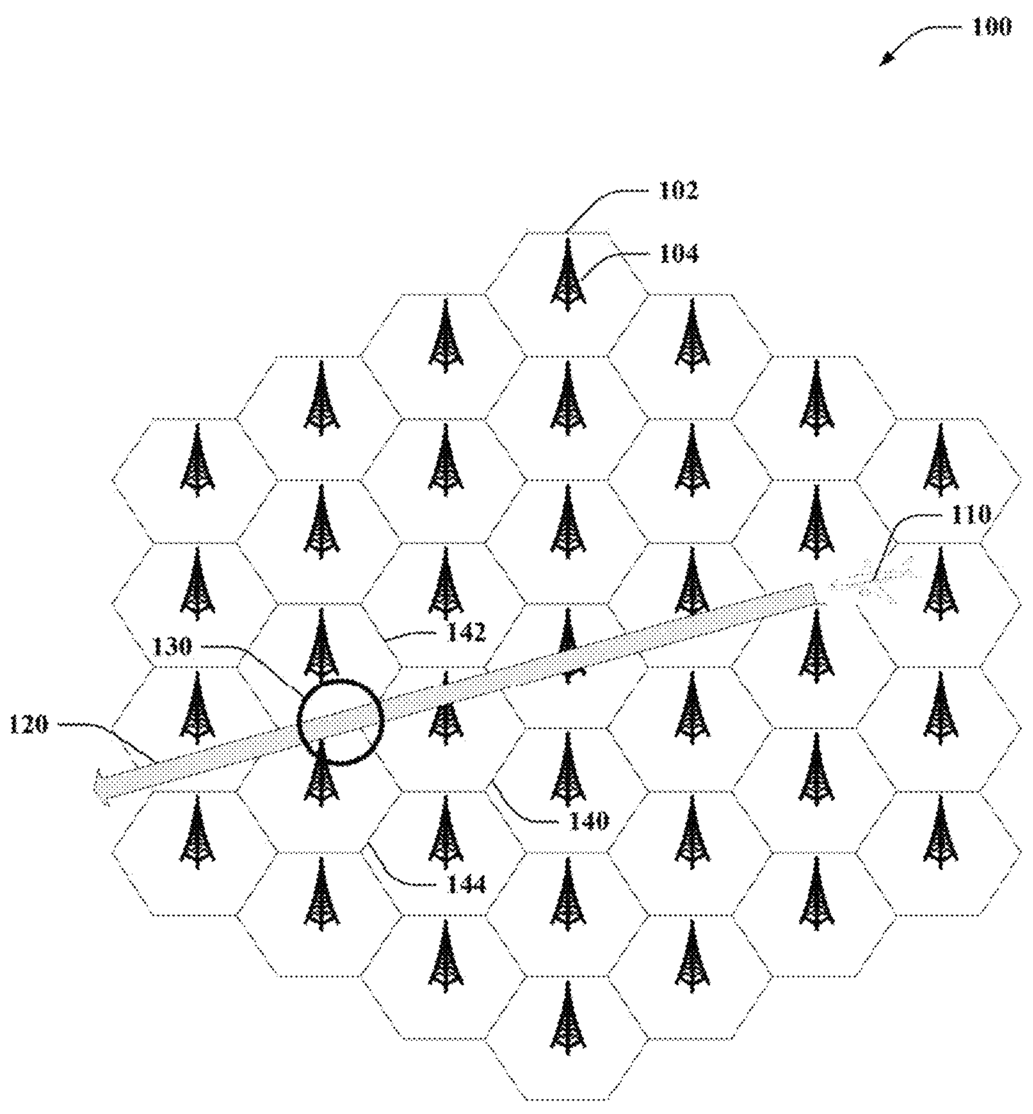
FIG. 1 illustrates an aircraft moving through the coverage areas of different access points over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used in herein, the terms "component," "module," "system," "device" and the like are intended to include a computer-related entity, such as but not limited to hardware, firmware, a combination of hardware and software, or software in execution on some sort of hardware. For example, a component may be, but is not limited to being, a process running on a processor, a processor, an object, an executable, a thread of execution, a program, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Artificial intelligence based systems (e.g., explicitly and/or implicitly trained classifiers) can be employed in connection with performing inference and/or probabilistic determinations and/or statistical-based determinations in accordance with one or more aspects of the subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for generating higher-level events from a set of events and/or data. Such inference results in the construction of new events or actions from a set of observed events or stored event data, regardless of whether the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.), for example, can be employed in connection with performing automatic and/or inferred actions in connection with the subject matter.

Thus, for example, some embodiments may provide a network device or system in which a component is provided to use internally or externally derived position information associated with mobile communication nodes within the network (e.g., an aircraft or the communication devices thereon) in order to make inferences and/or probabilistic determinations about where and when such nodes will be most advantageously served by various ones of the base stations of the network. Control signals and functionalities may therefore be generated for control of the base stations and/or for instruction to the communication nodes in order to facilitate efficient operation of the network. Load balancing, antenna beam steering, interference mitigation, network security and/or denial of service functions may therefore be enhanced by the operation of some embodiments.

Coverage ranges that may be possible to achieve in in-flight networks can be vastly larger than the ranges possible for ground based networks. Additionally, the mobile devices being served in an in-flight context are moving at much higher speeds, and over much longer distances, than a typical ground-based wireless customer. Based on this rapid movement, potentially large geographic displacement, and the fact that typical web services make no effort to know the actual location of the user, a good number of services provided to these (and potentially other) users become distorted relative to their actual location. For example, regardless of the actual location or destination of the user, the web services provided to the user will be associated with the point of attachment of the IP address assigned to the user. This means that a user that is currently on a flight to Los Angeles from New York City may receive web services or advertisements that are targeted for locations that are completely irrelevant to the user simply because the IP address for the connection point of the user is at the irrelevant location.

U.S. Pat. No. 9,325,793, which issued on Apr. 25, 2016, and the contents of which are incorporated herein in their entirety, recognized the unique travel context that may be shared by users on an aviation platform, and the interesting opportunities may exist in relation to content provision to the users based on location information associated with the aircraft. In this regard, U.S. Pat. No. 9,325,793 generally described the use of aircraft location information (and/or other information related to the aircraft and/or information related to the user) into requests originating from users on an aircraft being served in a wireless communication network capable of communicating with in-flight assets (such as an air-to-ground (ATG) network) in the form of a smart aviation dynamic cookie. The use of these smart aviation dynamic cookies approximated the function of a conventional cookie in some ways, but was distinguishable in function by the unique application and context involved the employment of these cookies in an in-flight network to perform "smart" or "intelligent" content leveraging the smart aviation dynamic cookie. Example embodiments seek to further the capability of using dynamic information about the location (or destination) of a user, by creating a contextually aware and/or "smart" IP address that allows any web service to use or learn the location of the user prior to providing a response to the user.

FIG. 1 illustrates an example layout of a wireless network 100 including multiple cells 102 for providing wireless communication services. The cells 102 can be implemented by one or more access points 104 to facilitate supporting wireless communications within a geographical coverage area of a given cell 102. In this regard, the one or more access points 104 can communicate with one or more wireless communication devices (not shown) present within a respective cell 102. The access points 104 can be assets of one or more existing wireless networks, and/or carriers supporting such networks. Each access point 104 has a wired (or wireless) backhaul connection to the one or more existing wireless networks to allow access thereto for the wireless communications devices connected with the access point 104. Moreover, the access points 104 can be provided via cellular towers or other tower structures (as in the depicted example), rooftops or other structures (e.g. building facades, church steeples, billboards, etc. . . . ) having wireless communication infrastructure, mobile vehicles and vessels, and/or the like. Furthermore, in existing wireless networks, it is to be appreciated that some cells 102 may overlap or completely encompass one another, and/or coverage gaps may exist between some cells 102, etc., though FIG. 1 shows a deployment of substantially adjacent cells that are deployed to provide continuous coverage over a relatively large area.

It should be appreciated that although the cells 102 of FIG. 1 are shown having a particular shape (i.e., a hexagonal shape), cells of example networks could have any shape depending on terrain and/or building constraints. Moreover, it should also be appreciated that although the access points 104 of FIG. 1 are shown to be positioned substantially in the center of the cells 102 with coverage being provided substantially 360 degrees around each respective one of the access points 104, this structure is not required in all examples. To the contrary, access points 104 could be at cell edges or at any other position within the cells 102, and the cells 102 could take any suitable shape dictated by the radiation patterns and sector coverage deployments of the antennas and antenna arrays provided at each respective one of the access points 104. It should also be appreciated that although the cells 102 are generally depicted to end their respective coverage areas where the corresponding coverage area of an adjacent cell begins, there will typically be some amount of overlap in coverage areas of adjacent cells 102.

In an example embodiment in which the wireless network 100 is an air-to-ground (ATG) network, the access points 104 may be enabled to establish wireless communication links to aircraft 110 or mobile communication nodes disposed thereon. The aircraft 110 can be expected to move through the network 100 in such a way as to require handover between various ones of the access points 104 in order to maintain continuous and uninterrupted communication between the mobile communication node(s) on the aircraft 110 and the network devices to which the backhaul connections couple the access points 104. The aircraft 110 may be a commercial or business jet or other airplane, or the aircraft 110 could be a drone, satellite, balloon, or other in-flight asset capable of communication with ground based communication equipment forming a network. Given that the cells 102 in an ATG network define three dimensional (3D) coverage areas that extend up to a predetermined altitude, it should therefore also be appreciated that the borders or edges between cells 102 may vary based on altitude. Thus, the borders between cells 102 in FIG. 1 may apply at a particular altitude. However, the borders may be different (or the same) at other altitudes. Thus, unlike a typical terrestrial network, where a change in latitude and longitude coordinates would typically be the driving determiner for which cell 102 the mobile communications nodes of the network select for communication purposes, within the network 100, a handover between cells could be necessitated or desirable merely on the basis of altitude change for a given location in terms of latitude and longitude coordinates.

As shown in FIG. 1, the aircraft 110 may follow a route 120 that causes the aircraft 110 to pass through certain ones of the cells 102. As the aircraft 110 passes through each respective one of the cells 102 along the route 120, the mobile communication node (or nodes) of the aircraft 110 may communicate with the respective 104 access points of the cells 102 along the route 120. However, the communication node (or nodes) of the aircraft 110 may not encounter or ever communicate with a number of the cells 102. In particular, the aircraft 110 may not communicate with cells 102 that are located remotely from the route 120.

Meanwhile, there may also be certain areas along the route 120 at which the aircraft 110 may be in or next two multiple cells 102 at a particular point in time. For example, in overlap region 130, the route 120 carries the aircraft 110 near the intersection of three different cells (e.g., a first cell 140, a second cell 142 and a third cell 144). The route 120 initially has the aircraft 110 completely within the first cell 140. However, the route 120 then carries the aircraft 110 proximate to the second cell 142. In this example, the aircraft 110 may actually spend a short time proximate to edges of the first cell 140, the second cell 142 and the third cell 144 at the same time. Then, the route 120 may provide that the aircraft 110 travels along the edge between the second cell 142 and the third cell 144 for a relatively long period of time.

In some networks, the mobile communication nodes on the aircraft 110 may be configured to request handover based on signal strength changes or the like in order to attempt to maintain continuous and uninterrupted coverage. Alternatively, the access points 104 may communicate with each other and/or the mobile communication nodes to handle handover decisions based on signal strength or other criteria.

In an in-flight communications system, the end-user equipment (e.g., wired and wireless routers, mobile phones, laptop computers, on-board entertainment systems, and/or the like) may be installed or otherwise present on the aircraft 110. The user equipment (UE) and any receiving and/or routing device(s) on the aircraft 110 itself may form mobile communication nodes of the wireless network 100. Accordingly, in-flight communications should be understood to involve communications from a network of ground (i.e., meaning land-based or sea-based, otherwise referred to as terrestrial) based access points to any in-flight asset (e.g., airplanes, drones, balloons, satellites, etc.) However, example embodiments are applicable to other wireless communication networks capable of communicating with in-flight assets beyond just ATG networks. As such, the ATG network applications described herein should be appreciated as being just one example of such a network. Networks employing satellites, other aircraft, drones, and/or the like to serve or communicate with other in-flight assets may also employ example embodiments as described herein. In an example embodiment, the utilization of position information associated with these mobile communication nodes (along with user information, if desired) may be incorporated into communication via the wireless network 100 to alter, enhance or augment the communications conducted via the wireless network 100. In this regard, for example, data, communications or messages leaving the aircraft 110 may be provided with an indication that the IP address of the originator of the communication/message has a dynamic context (and is potentially not located at the location associated with the connection point of the aircraft 110 to the network) associated therewith. The recipient of the communication/message may therefore request dynamic context information associated with the originator in order to provide a response that is tailored to the context (e.g., the actual physical or geographic location or destination) of the originator of the message rather than simply using the assumed (and often incorrect) location information associated with the point of connection of the user. Content tailored to or based on the location, destination, and/or point of origination of the user may therefore be provided to the UEs or other devices on the aircraft 110.

Figure 2:
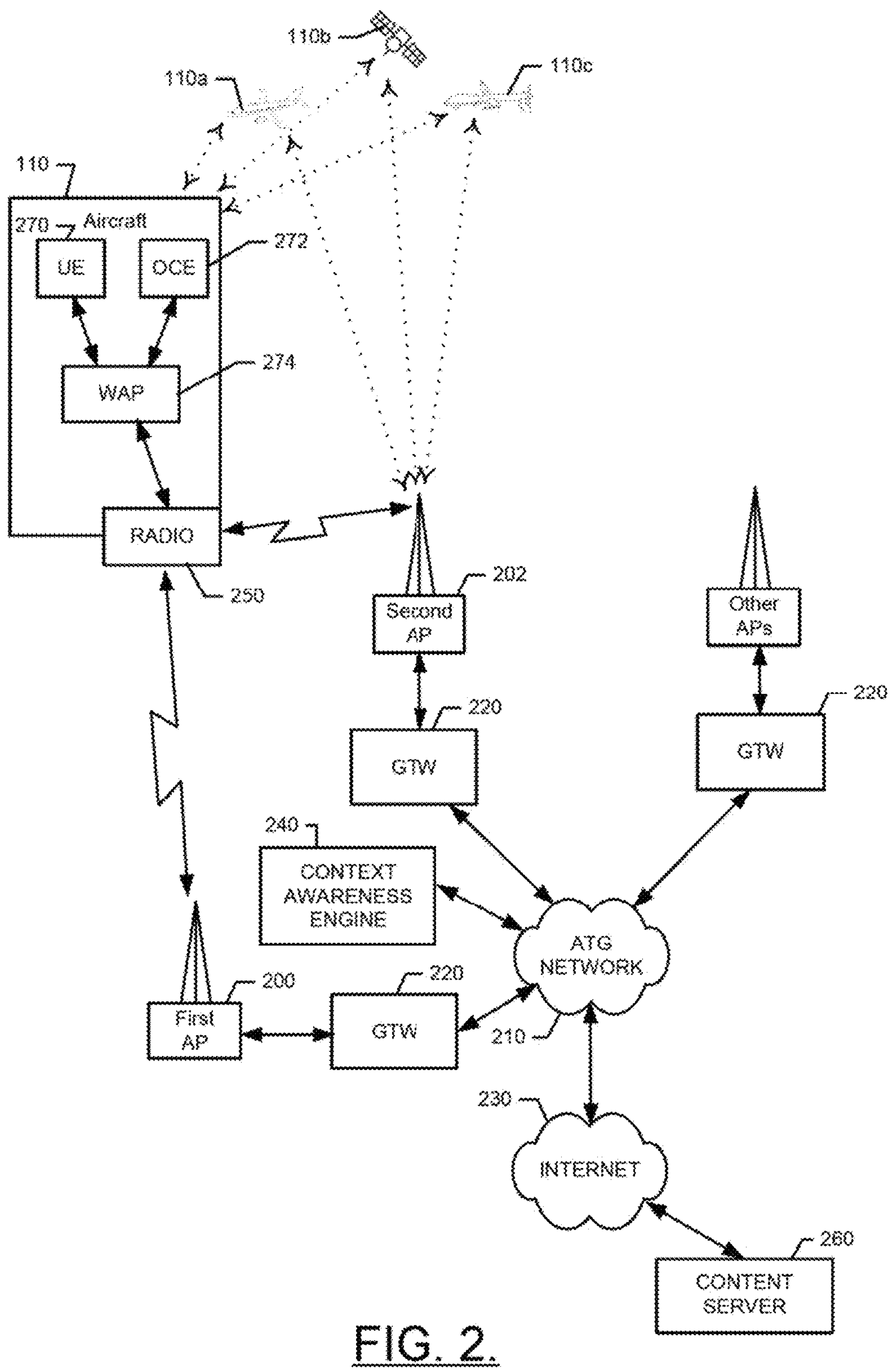
FIG. 2 illustrates a block diagram of a system for generating responses to requests to a content server in accordance with an example embodiment.

FIG. 2 illustrates a functional block diagram of some components and/or devices of a system facilitating communication in a wireless communication network capable of communicating with in-flight assets that may employ an example embodiment. As shown in FIG. 2, a first access point 200 and a second access point 202 may each be base stations (e.g., examples of access points 104) of an example embodiment of the wireless network 100, which in this case may be an ATG network 210. The ATG network 210 may further include other access points (APs) as well, and each of the APs may be in communication with the ATG network 210 via a gateway (GTW) device 220. The ATG network 210 may further be in communication with a wide area network such as the Internet 230, Virtual Private Networks (VPNs) or other communication networks. In some embodiments, the ATG network 210 may include or otherwise be coupled to a packet-switched core or other telecommunications network. As shown in FIG. 2, the aircraft 110 may be an airplane 110*a*, a satellite 110*b*, a drone 110*c* or any other in-flight asset (e.g., a balloon).

In an example embodiment, the ATG network 210 may include a context awareness engine 240 that may include, for example, processing circuitry configured to handle provision of position information and/or other information related to flight characteristics of the aircraft for communications provided in the ATG network 210 to influence the provision of content to assets on the aircraft 110 or elsewhere. Thus, for example, the context awareness engine 240 may be configured to handle the provision of an indication of the availability of position information for the originator of messages originating from the aircraft 110 for any message or communication to which a response is expected as described in greater detail below.

The context awareness engine 240 may be coupled to a data network, such as a local area network (LAN), a metropolitan area network (MAN), and/or a wide area network (WAN) (e.g., the Internet 230) indirectly via the ATG network 210. In turn, devices such as processing elements (e.g., personal computers, laptop computers, smartphones, server computers or the like such as the UEs 270 and OCEs 272) can be coupled to the ATG network 210 via the radio 250 on the aircraft 110. The ATG network 210 may then also couple these devices to the Internet 230 and/or to content servers associated with various web services or other entities. However, by employing an example embodiment, and incorporating certain aircraft information or other contextual information descriptive of the asset or platform accessing the ATG network 210 (or another network) as described herein, responses provided to the processing elements may be tailored based on the aircraft information or other context information specific to the asset or platform, as described herein.

Although not every element of every possible embodiment of the ATG network 210 is shown and described herein, it should be appreciated that the mobile communication nodes of or on the aircraft 110 may be coupled to one or more of any of a number of different public or private networks through the ATG network 210. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz or licensed band frequencies.

As shown in FIG. 2, the aircraft 110 may be capable of accessing content from and/or providing information or requests to the Internet 230 via the ATG network 210. More specifically, the aircraft 110 may include a radio 250 configured to communicate with the APs (e.g., the first AP 200 and the second AP 202) of the ATG network 210. The data, requests, messages and/or the like from the mobile communication devices of or on the aircraft 110 may therefore be communicatively coupled to a content server 260 accessible via the Internet 230. The mobile communication devices of or on the aircraft 110 may include UEs 270 of the passengers and/or crew and other on-board communication equipment (OCE) 272 of the aircraft 110. In some cases, a router of some sort (e.g., a wireless access point (WAP) 274) may be provided on the aircraft 110 to distribute communications received from the ATG network 210 to the UEs 270 and/or OCE 272. In an example embodiment, the communications between the Internet 230 and the UEs 270 or OCE 272 may occur substantially in real time. As such, for example, in some cases there may not be any on-board storage of the content received by the radio 250 prior to distribution of the content to the UEs 270 or OCE 272.

The content server 260 may be any server associated with a website, online service and/or the like. Accordingly, information flow for a typical request originating at the aircraft 110 (e.g., from the UE 270 or OCE 272) may be handled as shown in FIG. 3.

Figure 3:
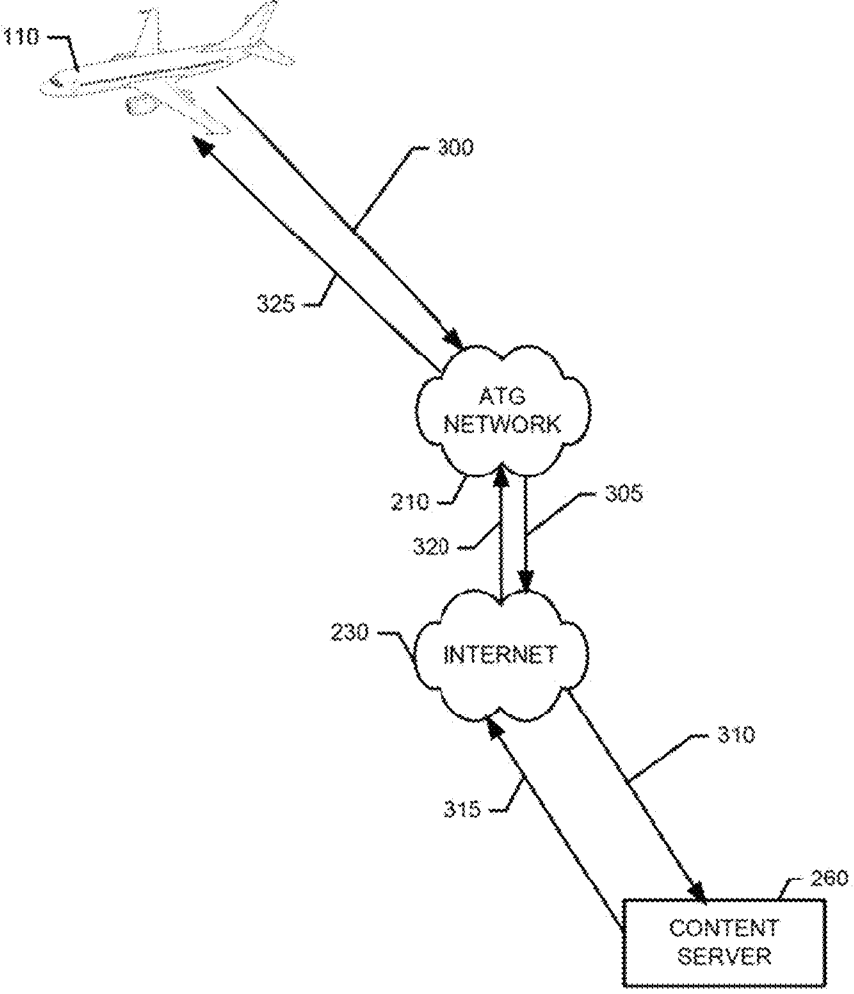
FIG. 3 illustrates a block diagram of communications not involving updates to dynamic context information according to an example embodiment.

Referring now to FIG. 3, a request may originate from the aircraft 110 (or a device thereon) and be provided to the ATG network 210 via ATG downlink 300. The request may be any typical IP request associated with a web service provided by the content server 260. Thus, the request may include the target IP address of the web service associated with the content server 260. However, the request also includes an IP address of or assigned to the originator (i.e., the aircraft 110 or the device thereon) to enable the response to the request to be potentially targeted to the requestor. The IP address of the originator is typically an IP address assigned in association with the ATG network 210 for the aircraft 110 and any other nodes connecting to the ATG network 210, and will be referred to as a network assigned IP address of the originator, or just an originator IP address. The originator IP address is typically associated with a geographic location of one or more physical facilities of the ATG network 210 where initial connection to the ATG network 210 is made. Thus, the originator IP address is not typically indicative of the actual geographic location of the aircraft 110. Accordingly, when the ATG network 210 (or some component provided thereat) routes the request as a routed message to the Internet 230 via link 305 using the target IP address of the web service or page associated with the content server 260, the originator IP address indicates a geographic location associated with the ATG network 210 and not the aircraft 110 or the device thereon.

The request is then routed to the content server 260 via link 310, which will in turn provide or otherwise route request to the content server 260 based on the target IP address. The content server 260 would normally determine a geographic location of the originator of the request based on the originator IP address and generate a response to the request. The response may include requested content that is directly responsive to the request. However, the response may also include additional content that is not directly responsive to the request. For example, if the request was a search operation, the requested content may include the results of running the search, and if the request is for service of a particular web page, the requested content may include the contents of the particular web page. The additional content, in either case, may be advertising content.

The response may be provided back to the requestor via link 315, which routes the response to the Internet 230 from the content server 260. Link 320 may then be used to provide the response to the ATG network 210 using the originator IP address. The ATG network 210 may then route the response back to the requestor on the aircraft 110 via uplink 325.

Either or both of the requested content and the additional content that may be included in the response could be generated or modified based on an identification of the location associated with the originator IP address. Thus, for example, if the requested content includes search results for a steakhouse, the search results themselves could be tailored to the location associated with the originator IP address. Meanwhile, if the requested content includes a web page associated with a particular service or information source, the particular service or information source could, in some cases, tailor the requested content to the location associated with the originator IP address. Regardless of the request, advertising content or other forms of additional content could be tailored to the location associated with the originator IP address.

The problem with this situation is quite clear. In the extremely likely event that the location or destination of the requestor does not match the location associated with the originator IP address, the provision of requested content and additional content that is in any way based on the location associated with the originator IP address will cause the requestor to receive content associated with an incorrect or irrelevant location. In order to address this problem, the context awareness engine 240 of FIG. 2 may be employed to provide the content server 260 with the ability to acquire the current location and/or destination of the requestor as described in greater detail in reference to FIG. 4 below.

Figure 4:
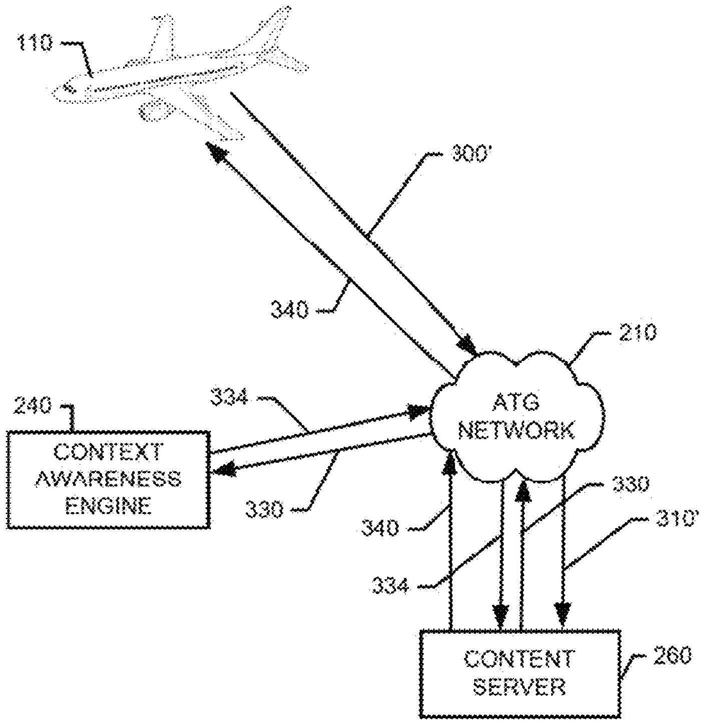
FIG. 4 illustrates a block diagram of communications involving updates to dynamic context information according to an example embodiment.

Referring now to FIG. 4, a request may originate from the aircraft 110 (or a device thereon) and be provided to the ATG network 210 via the ATG downlink 300' as described above. In this regard, the request may be sent in association with a source IP address assigned to the aircraft 110 by the ATG network 210. The request may otherwise also include the target IP address to enable the request to be routed to the content server 260 via link 310' using the target IP address of the web service or page associated with the content server 260. Of note, the request may be routed by link 310' directly to the content server 260 without intermediate routing via the Internet 230. Packets may be routed directly to the content server 260 via peering relationship rules (not over the Internet 230 in a transit mode). The peering between the ATG network 210 and any number of content servers or other networks may be accomplished in any suitable way. Typically, the networks or devices desiring to establish peering each connect to an exchange point, which could be public peering done through an Internet exchange in some cases. Regardless of the mechanism by which peering is accomplished, the typical transit routing through the Internet 230 (where control of various aspects of the packet routing are surrendered) can be avoided.

By routing the request directly to the content server 260 in this manner (i.e., by employing a peering relationship between the ATG network 210 and the content server 260), the source IP address is preserved, and is not changed to another address associated with the connection point of the user to the ATG network 210. Thereafter, the content server 260, receives the request and seeks to process the request accordingly. However, unlike the situation described above, the content server 260 may note that the source IP address is not a typical originator IP address indicating a geographic location associated with the ATG network 210, but is instead associated with the aircraft 110. Noting that the source IP address is associated with a moving platform having a dynamic context (i.e., the aircraft 110), the content server 260 may appreciate that the source IP address is not a typical IP address for which location of the connection point (i.e., the physical location of a connection point of the ATG network 210) is likely not an accurate indication of the location of the requestor, but that the requestor is likely mobile or moving and the source IP address can be used to query as to the current location or destination of the requestor as an update to the context of the requestor. As such, the source IP address may make the content server 260 contextually aware of the dynamic nature of the location of the requestor so that the content server 260 can use the contextual awareness to obtain information that will enable the content server 260 to provide relevant content (either as requested content or additional content) in the response to the request. Thus, the source IP address in the example of FIG. 4 may be considered to be a "smart" IP address since it makes the content server 260 contextually aware of the unique context of the requestor based on the unique IP address provided.

In some cases, the source IP address may be an address among a list of addresses previously provided to the content server 260 (and a plurality of other content servers) to inform the content server 260 that the source IP is associated with a platform having a dynamic context (including a dynamic location). Alternatively, certain IP addresses (or characteristics of IP addresses) may be reserved for platforms that have dynamic context capabilities to inform any content server following convention established regarding such dynamic context platforms that the corresponding IP address can be the subject of a lookup for updated context information (e.g., an aviation cookie or other updated context information) regarding the platform or asset having the dynamic context.

Accordingly, the content server 260 may make a request for an updated context for the requestor via the context awareness engine 240 of FIG. 2. In this regard, as shown in FIG. 4, the content server 260 (having recognized the source IP address as a smart IP address) may provide a context update request 330 to be directed to the context awareness engine 240 via the ATG network 210. The context awareness engine 240 may then provide a context update 334 to the ATG network 210, which forwards the context update 334 to the content server 260. Upon receipt of the context update 334, the content server 260 can tailor either or both of the requested content and the additional content to the updated context of the requestor and a response 340 to the original request may be provided back to the aircraft 110 via the ATG network 210 as shown in FIG. 4.

Figure 5:
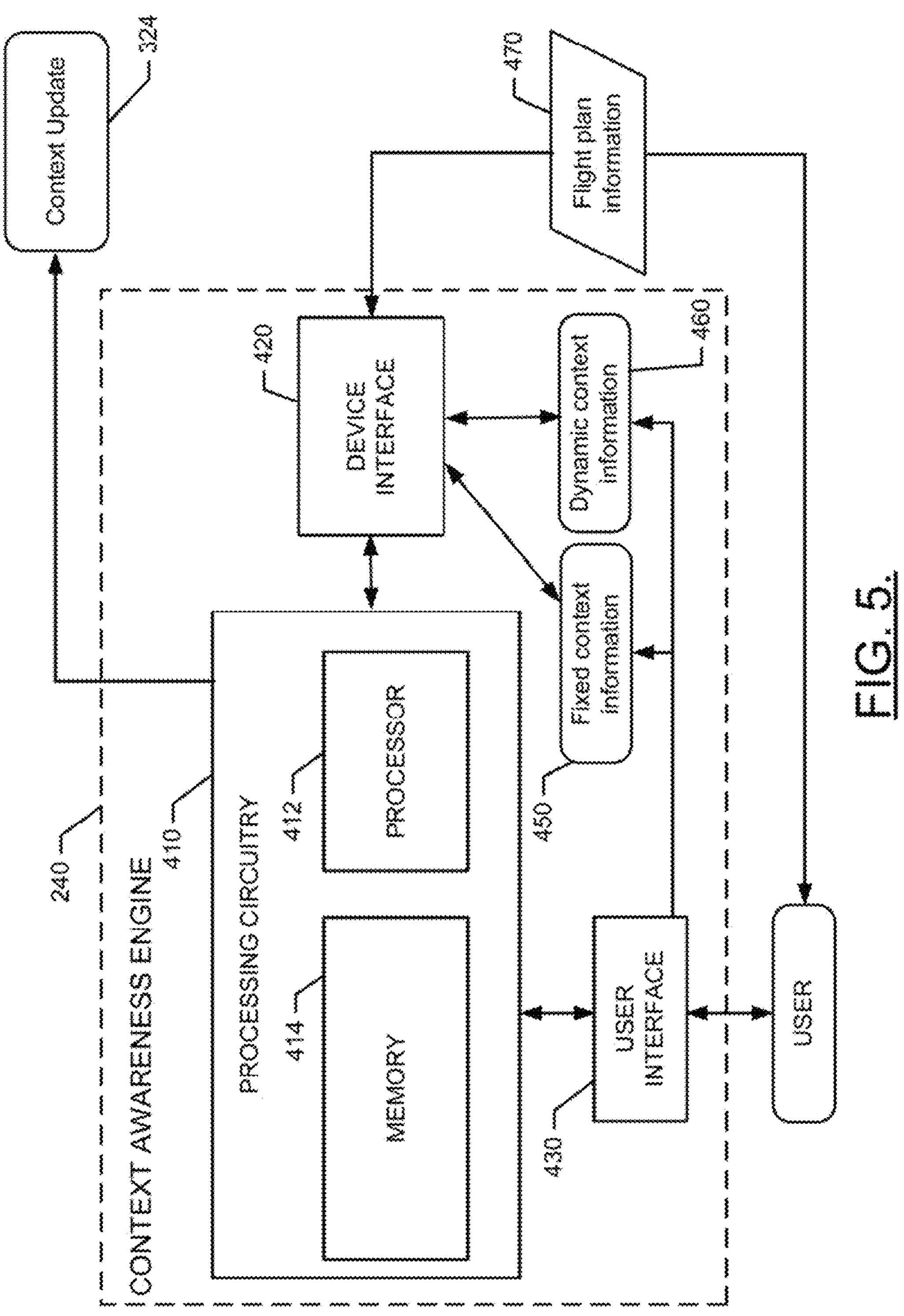
FIG. 5 illustrates a block diagram of a contextual awareness engine according to an example embodiment.

FIG. 5 illustrates one possible architecture for implementation of the context awareness engine 240 in accordance with an example embodiment. The context awareness engine 240 may include processing circuitry 410 configured to provide the context update 334 as described herein. The processing circuitry 410 may be configured to perform data processing, control function execution and/or other processing and management services according to an example embodiment of the present invention. In some embodiments, the processing circuitry 410 may be embodied as a chip or chip set. In other words, the processing circuitry 410 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 410 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 410 may include one or more instances of a processor 412 and memory 414 that may be in communication with or otherwise control a device interface 420 and, in some cases, a user interface 430. As such, the processing circuitry 410 may be embodied as a circuit chip (e.g., an integrated circuit chip) configured (e.g., with hardware, software or a combination of hardware and software) to perform operations described herein. In some embodiments, the processing circuitry 410 may communicate with various components, entities and/or sensors of the ATG network 210.

The user interface 430 (if implemented) may be in communication with the processing circuitry 410 to receive an indication of a user input at the user interface 430 and/or to provide an audible, visual, mechanical or other output to the user. As such, the user interface 430 may include, for example, a display, one or more levers, switches, indicator lights, touchscreens, proximity devices, buttons or keys (e.g., function buttons), and/or other input/output mechanisms. In some embodiments, crew of the aircraft 110, airline personnel and/or network personnel may interact with the user interface 430 to provide information that may be used to update or modify tables or other storage media that include information indicative of various travel context details about the aircraft 110. For example, the travel context details may include information such as the aircraft tail number, departure time/location, destination, arrival time, airline, airframe, IP address, network identification information, hardware identification information, etc.

The device interface 420 may include one or more interface mechanisms for enabling communication with other devices (e.g., modules, entities, sensors and/or other components of the aircraft 110 (or other components of the ATG network 210)). In some cases, the device interface 420 may be any means such as a device or circuitry embodied in either hardware, or a combination of hardware and software that is configured to receive and/or transmit data from/to modules, entities, sensors and/or other components of aircraft 110 (or the ATG network 210) that are in communication with the processing circuitry 410.

The processor 412 may be embodied in a number of different ways. For example, the processor 412 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 412 may be configured to execute instructions stored in the memory 414 or otherwise accessible to the processor 412. As such, whether configured by hardware or by a combination of hardware and software, the processor 412 may represent an entity (e.g., physically embodied in circuitry—in the form of processing circuitry 410) capable of performing operations according to embodiments of the present invention while configured accordingly. Thus, for example, when the processor 412 is embodied as an ASIC, FPGA or the like, the processor 412 may be specifically configured hardware for conducting the operations described herein. Alternatively, as another example, when the processor 412 is embodied as an executor of software instructions, the instructions may specifically configure the processor 412 to perform the operations described herein.

In an example embodiment, the processor 412 (or the processing circuitry 410) may be embodied as, include or otherwise control the operation of the context awareness engine 240 based on inputs received by the processing circuitry 410 responsive to receipt of dynamic aircraft information. As such, in some embodiments, the processor 412 (or the processing circuitry 410) may be said to cause each of the operations described in connection with the context awareness engine 240 in relation to generation of the context update 334 responsive to execution of instructions or algorithms configuring the processor 412 (or processing circuitry 410) accordingly. In particular, the instructions may include instructions for determining either current location information of the aircraft 110 and/or a destination location for the aircraft 110. The context update 334 may then be useable by the content server 260 for providing content back to the aircraft 110 (or entities thereon) based on the context update 334 as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the context awareness engine 240 as described herein.

In some embodiments, the context awareness engine 240 may provide the context update 334 to include the aviation cookie described in U.S. Pat. No. 9,325,793. Alternatively or additionally, the context update 334 may include context information that indicates aircraft location, destination and/or point of origination. Alternatively or additionally, the context update 334 may indicate information about the aircraft 110 that is sufficient to allow at least the destination or point of origination to be determined (e.g., from a lookup table of aircraft flight plans). In some cases, the context update 334 may provide identity information about the airline and/or aircraft 110. In some cases, the context update 334 may be coded, may be a hash of information that can be determined using a hash table as a reference, and/or may include a series of informational flags or data bins that are coded to allow a significant amount of information to be determined from a relatively small amount of transmitted data in the context update 334. In some cases, the provision of location, destination, identity and/or point of origin information may be made directly or in a code/hash within the context update 334. However, in other cases, the context update 334 may include a pointer or other coded input a table, website or other resource to enable the content server 260 to reference such resource in order to decipher the context update 334 and serve content accordingly.

As can be appreciated from the description above, the context awareness engine 240 may be updated either manually or automatically when the aircraft 110 (or specifically when the radio 250 or any UE 270 or OCE 272 thereon) is activated onto the ATG network 210 to include the tail number or some other identifier associated with the aircraft 110. The identifier of the aircraft 110 may then be stored in association with fixed context information 450 and/or dynamic context information 460 associated with the aircraft 110 for use in context updating. For example, the physical hardware address of the WAP 274 or the radio 250 may be cross referenced with the identifier so that the fixed and dynamic context information 450 and 460 can be looked up at any time based on the identifier of the aircraft 110. The fixed context information 450 may include any or all of the airline or operator with which the aircraft 110 is associated, the airframe, the tail number and/or any other context information that generally does not change. The dynamic context information 460 may include departure location and/or time, destination location and/or time, current location, or any other context information that generally changes for the aircraft 110.

In an example embodiment, the context awareness engine 240 may receive flight plan information 470 either via the user or via the device interface 420. The flight plan information 470 may be used to update the dynamic context information 460 upon receipt. The flight plan information 470 may include information such as the departure location and/or time, destination location and/or time, route details (e.g., course, speed, altitude, etc.) and the like. Accordingly, the dynamic context information 460 may continuously represent the most up to date information regarding the location or destination of the aircraft 110. In some cases, the context awareness engine 240 may be configured to insert some or all of the dynamic context information 460 into an aviation cookie, or otherwise provide such information in the context update 334. Thus, whenever the UE 270 or OCE 272 perform an activity that involves or could involve content dependent upon location, the corresponding request that is received by the content server 260 may be determined by the content server 260 to be coming from an asset with a dynamic context based on the source IP address being a smart IP address (or corresponding to an aircraft or other high-speed mobile asset). The content server 260, based on knowledge of the source of a request having a dynamic context based on a priori knowledge of the source IP address being associated with a platform having a dynamic context, may then perform a lookup or otherwise query for the context update 334 as described above. The response to the original request may thereafter be generated based on the context update 334, which may include an aviation cookie or otherwise provide location or destination information for the aircraft 110.

Other contextual details may also be provided and used to tailor information to the user as well. Those contextual details could be fixed or dynamic context information in various different embodiments. For example, fixed context information such as the airline, service provider, company, etc., with which the source IP address is affiliated could receive special instructions, offers, messages or other content based on those other contextual details. Other dynamic context information may include time of arrival, day of the week, holiday travel, etc. Discount tickets, tours, transportation offers and other related services can be provided (e.g., as the additional content (ad content) mentioned above) to users based on any of these other contextual details. Feedback forms, surveys, and/or the like may also be provided based on contextual details.

Example embodiments may be used to allow ad networks, web services, and/or the like to know, for example, that a request originated at an aircraft (or other fast moving platform), and further know to which destination the platform is headed. Ad targeting (e.g., additional content) may therefore be provided within applications associated with other web services (e.g., requested content) and either or both of the additional content and requested content may be tailored to the location or destination of the platform. As an example, a search for rental cars that is originated from an aircraft can provide search results for the destination of the aircraft (rather than the attachment point of the aircraft to the network). Meanwhile, ads for additional services such as tour, restaurant or movie coupons or offers may also be targeted for the destination of the aircraft instead of the location of the connection point to the ATG network 210.

As noted above, although one example embodiment described herein relates to fast moving platforms and/or ATG networks, it should be appreciated that example embodiments further apply to other entities in other contexts as well. For example, any industry in which there is a general masking of traffic that results in a massive amount of users being apparently located at a single location that is often not accurate (e.g., hotel guests, hospital patients, stadium attendees, theme park customers, airport users, employees of various enterprises, etc.), example embodiments could be used to indicate that the source IP address for the user is affiliated with a dynamic context. For example, a user at a hotel chain, or at a company with a network that has a single connection point to the Internet for all users that originate requests on their network would also benefit from the ability to update contexts of individual users by signaling to the content server or provider that the IP address is a "smart" IP address for which contextual awareness can be updated. Thus, content providers may therefore have the ability, after recognizing an IP address from a dynamic context, of employing example embodiments to get a context update specific to the location, destination or other pertinent information related or specific to the originator of a particular request.

Figure 6:
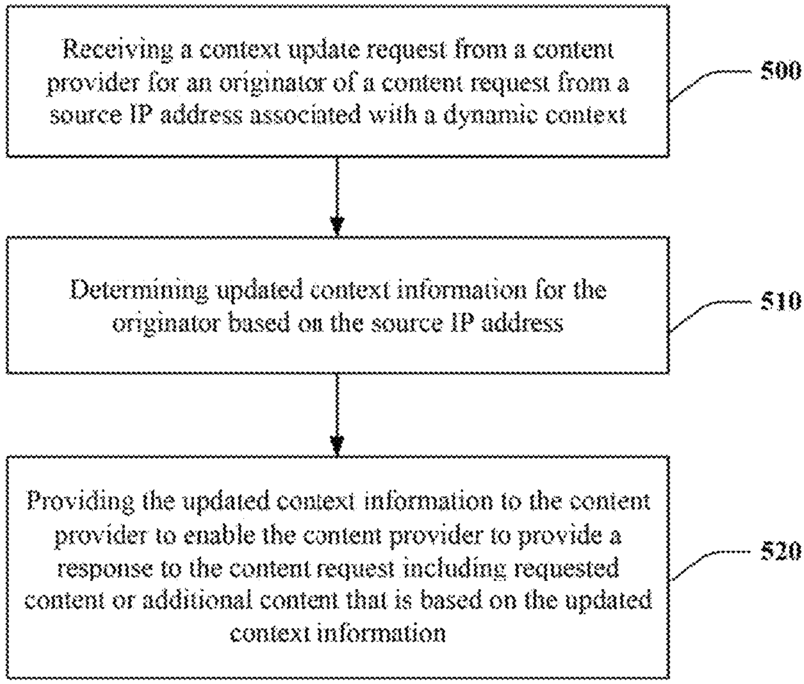
FIG. 6 illustrates a method of providing a smart or contextually aware IP address according to an example embodiment.
Figure 7:
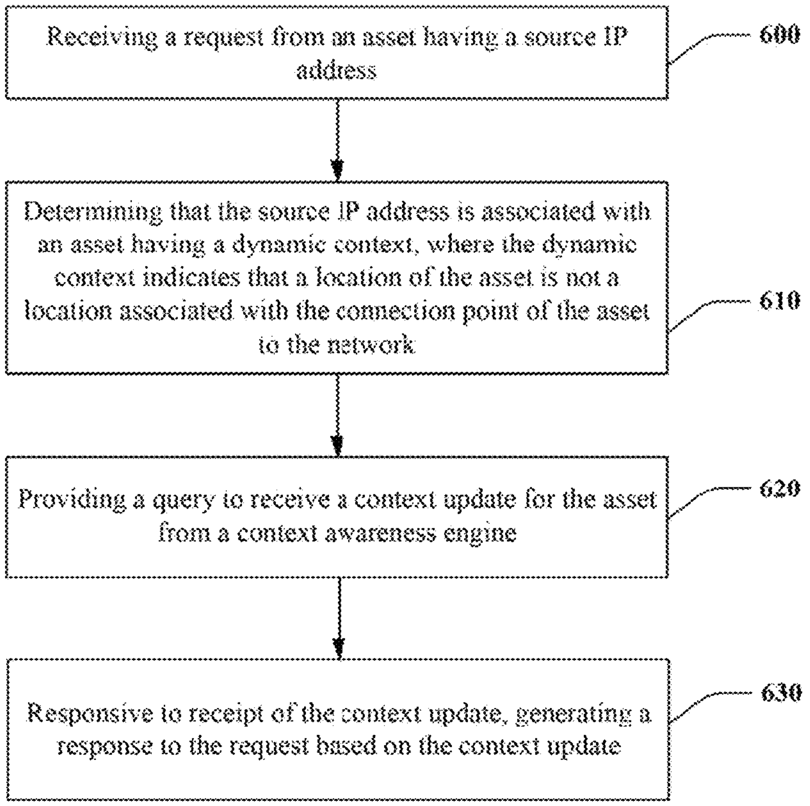
FIG. 7 illustrates method for employing the smart or contextually aware IP address in accordance with an example embodiment.

As such, the system of FIGS. 1 and 2 may provide an environment in which the context awareness engine 240 of FIGS. 2, 4 and 5 may provide a mechanism via which a number of useful methods may be practiced. FIGS. 6 and 7 each illustrate a block diagram of one method that may be associated with the system of FIGS. 1 and 2 and the context awareness engine 240 of FIGS. 2, 4 and 5. From a technical perspective, the context awareness engine 240 described above may be used to support some or all of the operations described in FIG. 6, and the content server may support some or all of the operations of FIG. 7. As such, the platform described in FIGS. 1 and 2 may be used to facilitate the implementation of several computer program and/or network communication based interactions. As an example, FIGS. 6 and 7 are each a flowchart of a method and program product according to an example embodiment of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., of the context awareness engine 240 or content server 260) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving a context update request from a content provider for an originator of a content request from a source IP address associated with a dynamic context at operation 500, determining updated context information for the originator based on the source IP address at operation 510, and providing the updated context information to the content provider to enable the content provider to provide a response to the content request including requested content or additional content that is based on the updated context information at operation 520.

In some embodiments, the method may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, the originator of the content request may be located on an in-flight aircraft. In some cases, the updated context information may include a destination of the in-flight aircraft. In an example embodiment, the destination of the aircraft may be determined based on flight plan information associated with the in-flight aircraft. In some cases, the updated context information may be determined by cross referencing fixed context information associated with the source IP address to dynamic context information indicative of a physical location of the originator. In an example embodiment, the updated context information may be determined by the context awareness engine cross referencing fixed context information associated with the source IP address to dynamic context information indicative of a destination of the originator.

In another example method, shown in the block diagram of FIG. 7, the content server is generally the performer of the method. The content server may be configured to provide responses to requests received via a network that is configured to provide a connection point for a plurality of communication assets that provide the requests. The content server may be configured to execute the method including receiving a request from an asset having a source IP address at operation 600, determining that the source IP address is associated with an asset having a dynamic context, where the dynamic context indicates that a location of the asset is not a location associated with the connection point of the asset to the network at operation 610, providing a query to receive a context update for the asset from a context awareness engine at operation 620, and, responsive to receipt of the context update, generating a response to the request based on the context update at operation 630.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method comprising:

receiving a request for content from a mobile communication device via a communication network that is configured to provide a connection point for a plurality of communication devices, the mobile communication device having a source internet protocol (IP) address;

determining that the source IP address is one of a plurality of smart IP addresses that indicate that each device associated with one of the smart IP addresses is a device that has a dynamic geographic location that is not located at the connection point;

providing a query to receive a context update for the mobile communication device based on the source IP address being determined to be one of the plurality of smart IP addresses; and responsive to receipt of the context update, generating a response to the request based on the context update, wherein the context update comprises a determination of a current location or destination of the mobile communication device.

2. The method of claim 1, wherein the query is provided to a context awareness engine located in the communication network.

3. The method of claim 2, wherein the mobile communication device is an in-flight aircraft and the network is an air-to-ground (ATG) network.

4. The method of claim 3, wherein the context update is performed based on flight plan information associated with the in-flight aircraft.

5. The method of claim 2, wherein the context update is determined by the context awareness engine by cross referencing fixed context information associated with the source IP address in a lookup table to determine dynamic context information indicative of a geographic location that is the destination of the mobile communication device.

6. The method of claim 5, wherein the request is a search operation, and the response comprises search results corresponding to the destination of the mobile communication device.

7. The method of claim 2, wherein the context update is determined by the context awareness engine by cross referencing fixed context information associated with the source IP address in a lookup table to determine dynamic context information indicative of a geographic location that is the current location of the mobile communication device.

8. The method of claim 7, wherein the request is a search operation, and the response comprises search results corresponding to the current location of the mobile communication device.

9. The method of claim 2, wherein the context update is determined by the context awareness engine by cross referencing fixed context information associated with the mobile communication device to dynamic context information associated with the mobile communication device.

10. The method of claim 9, wherein the fixed content information and dynamic context information are associated with each other in a lookup table.

11. The method of claim 10, wherein the lookup table is manually updated based on flight plan information associated with the mobile communication device.

12. The method of claim 10, wherein the lookup table is automatically updated based on flight plan information associated with the mobile communication device.

13. The method of claim 9, wherein the fixed context information comprises a location of the connection point within the network, and the dynamic context information comprises the current location of the mobile communication device.

14. The method of claim 9, wherein the fixed context information comprises a location of the connection point within the network, and the dynamic context information comprises the destination of the mobile communication device.

15. A system comprising:

a plurality of communication assets;

a network configured to provide a connection point for each of the communication assets to communicate with one or more content servers to provide requests to the content servers and receive responses from the content servers; and a context awareness engine operably coupled to the network, wherein the context awareness engine is configured to provide a context update to a particular one of the one or more content servers responsive to a context update request from the particular one of the content servers, wherein the context update request is generated responsive to receipt of a source internet protocol (IP) address from a mobile communication device that is one of the communication assets, wherein the source IP address is one of a plurality of smart IP addresses stored at the content server to indicate that each communication device associated with one of the smart IP addresses is mobile and therefore has a dynamic geographic location, and wherein the context update comprises a determination of a current location of the mobile communication device that is different than the connection point.

16. The system of claim 15, wherein the mobile communication device comprises an in-flight aircraft and the network is an air-to-ground (ATG) network.

17. The system of claim 16, wherein the context update is performed based on flight plan information associated with the in-flight aircraft.

18. A system comprising:

a plurality of communication assets;

a network configured to provide a connection point for each of the communication assets to communicate with one or more content servers to provide requests to the content servers and receive responses from the content servers; and a context awareness engine operably coupled to the network, wherein the context awareness engine is configured to provide a context update to a particular one of the one or more content servers responsive to a context update request from the particular one of the content servers, wherein the context update request is generated responsive to receipt of a source internet protocol (IP) address from a mobile communication device that is one of the communication assets, wherein the source IP address is one of a plurality of smart IP addresses stored at the content server to indicate that each communication device associated with one of the smart IP addresses is mobile and therefore has a dynamic geographic location, and wherein the context update comprises a determination of a destination of the mobile communication device that is different than the connection point.

19. The system of claim 18, wherein the mobile communication device comprises an in-flight aircraft and the network is an air-to-ground (ATG) network.

20. The system of claim 19, wherein the context update is performed based on flight plan information associated with the in-flight aircraft.

* * * * *